(12) United States Patent
Lee

(10) Patent No.: US 6,598,008 B2
(45) Date of Patent: Jul. 22, 2003

(54) METHOD OF ESTIMATING SPEED OF INDUCTION MOTOR AND MAGNETIC FLUX OF ROTOR

(75) Inventor: Sang-Hoon Lee, Seongnam (KR)

(73) Assignee: Samsung Electronics Co., Ltd., Suwon (KR)

( * ) Notice: Subject to any disclaimer, the term of this patent is extended or adjusted under 35 U.S.C. 154(b) by 71 days.

(21) Appl. No.: 09/961,252

(22) Filed: Sep. 25, 2001

(65) Prior Publication Data

US 2003/0009309 A1 Jan. 9, 2003

(30) Foreign Application Priority Data

Jul. 6, 2001 (KR) ........................................ 2001-40217

(51) Int. Cl.⁷ .............................. G01P 3/00; G06F 15/00
(52) U.S. Cl. ....................... 702/147; 318/801; 318/805; 318/811; 318/727; 318/799
(58) Field of Search ................................. 702/147, 142, 702/145, 96, 105; 318/727, 799, 801, 805, 811

(56) References Cited

U.S. PATENT DOCUMENTS

| | | | |
|---|---|---|---|
| 5,998,958 A | * 12/1999 | Lee | 318/801 |
| 6,081,093 A | 6/2000 | Oguro et al. | 318/807 |
| 6,281,656 B1 | * 8/2001 | Masaki et al. | 318/700 |
| 6,396,229 B1 | * 5/2002 | Sakamoto et al. | 318/439 |

* cited by examiner

*Primary Examiner*—John Barlow
*Assistant Examiner*—Hien Vo
(74) *Attorney, Agent, or Firm*—Staas & Halsey LLP

(57) ABSTRACT

A method of estimating the speed of an induction motor and the magnetic flux of a rotor is disclosed. The method consists of the steps of a) obtaining some measurable or calculable variables for estimating the speed of the induction motor and the magnetic flux of the rotor; b) calculating a parameter as a counter-electromotive force of the motor derived from the variables obtained in the step a); c) estimating the speed of the motor by use of the parameter calculated in the step b), an estimated value of the parameter, and the obtained variables; and d) estimating the magnetic flux of the rotor by use of an estimated value of the speed estimated in the step c) and the parameter. As the present invention estimates the speed of the motor and the magnetic flux of the rotor using the parameters obtained from the measurable or calculable variables, an estimation algorithm requires fewer calculation equations compared the prior estimation algorithm using the full-order observer, resulting in a reduced amount of calculation. Accordingly, a sensorless speed control system of the induction motor can be easily implemented with the superiority of low-speed characteristic and the stable and fast response characteristics of speed in a wide operation region.

5 Claims, 3 Drawing Sheets

US 6,598,008 B2

METHOD OF ESTIMATING SPEED OF INDUCTION MOTOR AND MAGNETIC FLUX OF ROTOR

BACKGROUND OF THE INVENTION

1. Field of the Invention

The present invention relates generally to a method of estimating both the speed of an induction motor and the magnetic flux of a rotor, and more particularly to a method of estimating the speed of an induction motor and the magnetic flux of a rotor by use of parameters derived from some measurable or calculable variables.

2. Description of the Prior Art

In general, a speed control system for induction motors employs a system which feeds back the speed of the induction motor detected by a speed sensor installed in the motor, compares it with a speed command of the induction motor, and controls the speed of the induction motor according to an error resulted from the comparison.

However, as the speed sensor installed in the motor is susceptible of noise and has an installation limit, a variety of methods of estimating the speed of such motors without the speed sensor have been studied and developed, with one of them illustrated in FIG. 1.

FIG. 1 shows a schematic configuration of a conventional system for estimating the speed of an induction motor and the magnetic flux of a rotor. Referring to FIG. 1, the system 10 for estimating the speed of an induction motor and the magnetic flux of a rotor includes a full-order observer 11 for obtaining estimated values of current and magnetic flux, and a speed estimator 12 for estimating the speed of the induction motor by use of an actual current and the estimated values of current. Herein, the full-order observer 11 and the speed estimator 12 are not a mechanical device of general concept consisting of elements such as actual electrical parts or circuit components, but elements of a virtual device represented in a mechanical manner by an algorithm present in a program of a microprocessor.

The conventional system for estimating the speed of the induction motor and the magnetic flux of the rotor using such a sensorless vector control system measures a voltage vector $V_{ds}$ and a current vector $i_{ds}$ of a voltage applied upon driving the induction motor, and obtains an estimated value of current and an estimated value of magnetic flux by use of the full-order observer 11. In addition, the speed of the induction motor is estimated by the speed estimator 12 by use of an error resulted from a comparison of the actual current with the estimated value of current.

However, as the conventional system for estimating the speed of the induction motor and the magnetic flux of the rotor requires a calculating equation for each of the current estimation, the magnetic flux estimation and the speed estimation, an amount of calculation is undesirably increased and an estimation algorithm must be performed during each performance period. This leads to a limitation in response characteristics of the motor speed control, resulting in deterioration of the system performance.

SUMMARY OF THE INVENTION

Accordingly, the present invention has been made keeping in mind the above problem occurring in the prior art, and an object of the present invention is to provide a method of estimating the speed of an induction motor and the magnetic flux of a rotor by use of parameters derived from some measurable or calculable variables, while reducing an amount of calculation.

In order to accomplish the above object, the present invention provides a method of estimating the speed of an induction motor and the magnetic flux of a rotor, comprising the steps of: a) obtaining some measurable or calculable variables for estimating the speed of the induction motor and the magnetic flux of the rotor; b) calculating a parameter as a counter-electromotive force of the motor derived from the variables obtained in the step a); c) estimating the speed of the motor by use of the parameter calculated in the step b), an estimated value of the parameter, and the obtained variables; and d) estimating the magnetic flux of the rotor by use of an estimated value of the speed estimated in the step c) and the parameter.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
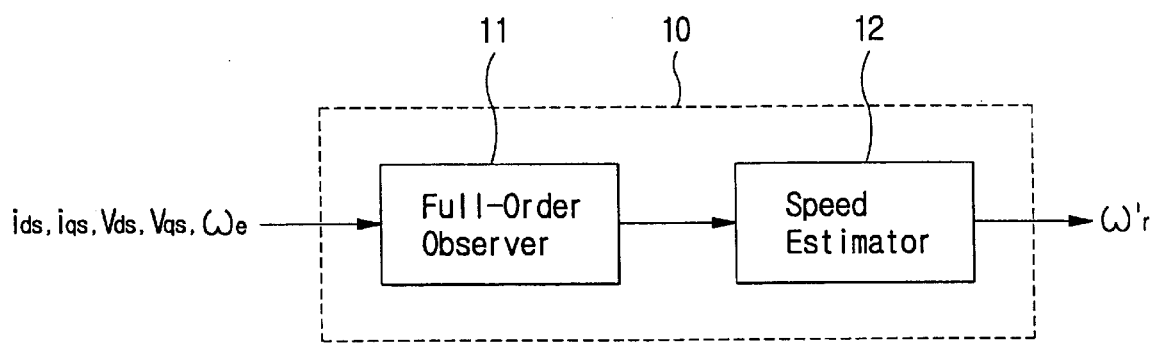
FIG. 1 shows a schematic configuration of a conventional system for estimating the speed of an induction motor and the magnetic flux of a rotor.

Reference now should be made to the drawings, in which the same reference numerals are used throughout the different drawings to designate the same or similar components.

Figure 2:
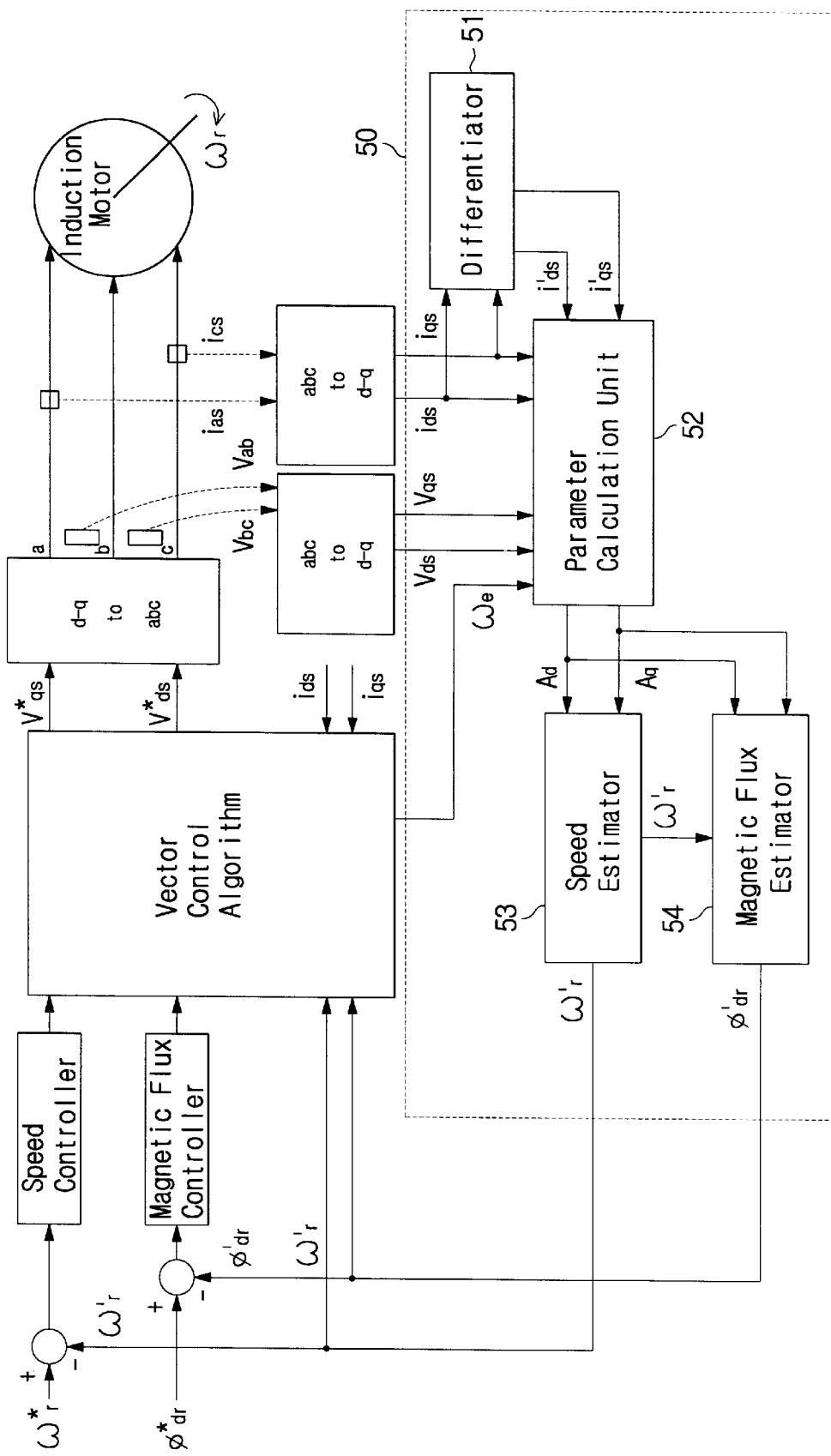
FIG. 2 shows a configuration of a system for estimating the speed of an induction motor and the magnetic flux of a rotor according to the present invention, which is employed in a sensorless speed control system for such induction motors.

FIG. 2 shows a configuration of a system for estimating the speed of an induction motor and the magnetic flux of a rotor according to the present invention, which is employed in a sensorless speed control system for induction motors.

Referring to FIG. 2, a system 50 for estimating the speed of an induction motor and the magnetic flux of a rotor according to the present invention includes a differentiator 51 for differentiating motor currents $i_{ds}$ and $i_{qs}$ to output differential values $i'_{ds}$ and $i'_{qs}$. In the system 50, a parameter calculation unit 52 receives motor voltages $V_{ds}$ and $V_{qs}$ being variables for estimating both the speed of the motor and the magnetic flux of the rotor, the motor currents $i_{ds}$ and $i_{qs}$, a synchronization rotation angular speed $\omega_e$, and the differential values $i'_{ds}$ and $i'_{qs}$ from the differentiator 51 to calculate parameters $A_d$ and $A_q$ corresponding to the counter-electromotive force of the motor. In addition, a speed estimator 53 receives the parameters calculated by the parameter calculation unit 52 to output an estimated value of speed $\omega'_r$, while a magnetic flux estimator 54 receives the estimated value of speed $\omega'_r$ estimated by the speed estimator 53 to output an estimated value of magnetic flux $\phi'_{dr}$. Herein, each of the elements of the system 50 is not a mechanical device of general concept consisting of elements such as actual electrical parts or circuit components, but elements of a virtual device represented in a mechanical manner by an algorithm present in a program of a microprocessor.

The estimation system 50 estimates the speed of a motor by use of the parameters and the variables and then estimates the magnetic flux of a rotor by use of the estimated value of speed and the parameters. This reduces a required amount of calculation equations compared to the prior processes, which only obtain the estimated value of speed after obtaining both the estimated value of current and the estimated value of magnetic flux. In other words, as the process of obtaining the estimated value of current can be omitted, an amount of calculation is reduced during each performance period.

Figure 3:
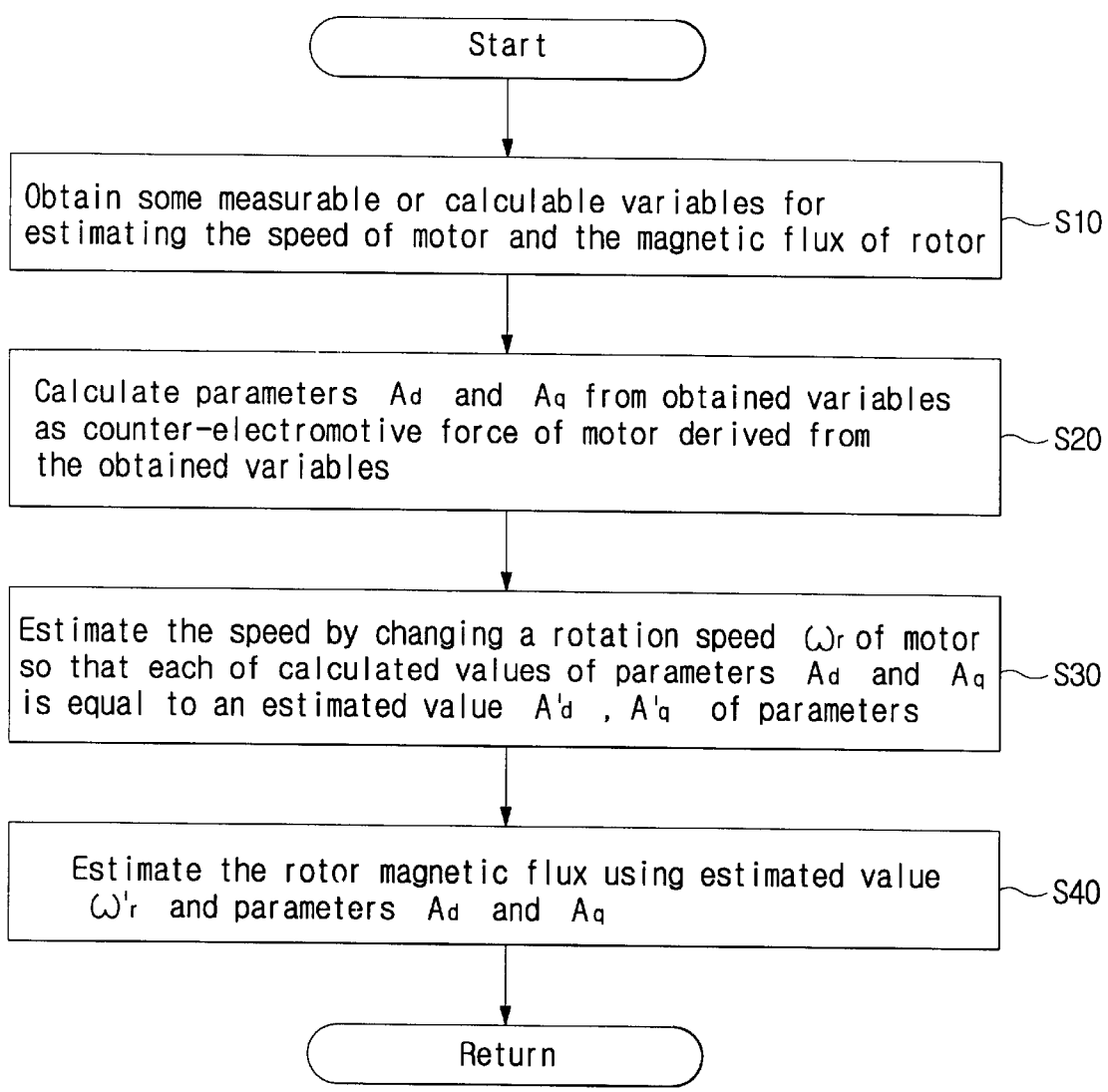
FIG. 3 shows a flowchart for illustrating the method of estimating the speed of the induction motor and the magnetic flux of the rotor according to the present invention.

Now, a method of estimating the speed of an induction motor and the magnetic flux of a rotor in the above system 50 is described with reference to FIGS. 2 and 3.

First, at step S10, motor currents $i_{ds}$ and $i_{qs}$ measurable or calculable by means of a sensor, differential values $i'_{ds}$ and $i'_{qs}$, of the motor currents, motor voltages $V_{ds}$ and $V_{qs}$, and a synchronization rotation angular speed $\omega_e$ are obtained as variables, which are required to estimate the speed of the induction motor and the magnetic flux of the rotor and provided for the parameter calculation unit 52.

The parameter calculation unit 52 obtains parameters $A_d$ and $A_q$ from the obtained variables by the following expressions at step S20.

$$A_d = (i'_{ds} - \omega_e i_{qs} + a_1 i_{ds} - a_0 V_{ds})/a_3$$

$$A_q = (i'_{qs} - \omega_e i_{ds} + a_1 i_{qs} - a_0 V_{qs})/a_3$$

$$a_0 = 1/(\sigma L_s),\ a_1 = a_0 R_s + M a_2$$

$$a_2 = a_3 a_4,\ a_3 = a_0 M/L_r,\ a_4 = R_r/L_r$$

Where, $A_d$ is a parameter of d-axis, $A_q$ is a parameter of q-axis, $\omega_e$ is a synchronization rotation angular speed, $i_{ds}$ is a stator current of d-axis, $i'_{ds}$ is a differential value of stator current of d-axis, $i_{qs}$ is a stator current of q-axis, $i'_{qs}$ is a differential value of stator current of q-axis, $V_{ds}$ is a stator voltage of d-axis, $V_{qs}$ is a stator voltage of q-axis, $L_s$ is a stator inductance, $R_s$ is a stator resistance, M is a mutual inductance, $L_r$ is a rotor inductance, $R_r$ is a rotor resistance, and $a_0 \sim a_4$ are motor model variables.

The parameters $A_d$ and $A_q$ of d- and q-axes, respectively, are applied to the speed estimator 53 and the magnetic flux estimator 54.

The speed estimator 53 receives the parameters $A_d$ and $A_q$ and then obtains the estimated value $\omega'_r$ of speed by the following expressions at step S30.

$$dA'_d/dt = -a_4 A'_d + (\omega_e - p\omega'_r)A'_q + a_5(a_4 i_{ds} + p\omega' i_{qs})$$

$$dA'_q/dt = -a_4 A'_q + (\omega_e - p\omega'_r)A'_d + a_5(a_4 i_{qs} - p\omega' i_{ds})$$

$$d\omega'_r/dt = -[(A_d - A'_d)(a_5 i_{qs} - A_q) - (A_q - A'_q)(a_5 i_{ds} - A_d)]/p$$

Where, $\omega'_r$ is an estimated value of speed, $A'_d$ is an estimated value of parameter of d-axis, $A'_q$ is an estimated value of parameter of q-axis, p is a number of pole-pairs, $a_5$ is a motor model variable, and $a_5 = M a_4$.

The speed estimator 53 changes the rotation speed $\omega_r$ of the motor so that each of differences [$(A_d - A'_d)$ and $(A_q - A'_q)$] between a calculated value of parameter and the estimated value of parameter becomes zero for obtaining the estimated value $\omega'_r$ of speed.

When the estimated value $\omega'_r$ of speed is obtained, the rotor magnetic flux estimator 54 obtains the estimated values $\phi'_{dr}$ and $\phi'_{qr}$ of rotor magnetic flux, using the estimated value $\omega'_r$ of speed and the parameters $A_d$ and $A_q$, by the following expressions at step S40.

$$\phi'_{dr} = (a_4 A_d - p\omega' A_q)/[|a_4|^2 + |p\omega'_r|^2]$$

$$\phi'_{qr} = (a_4 A_q + p\omega' A_d)/[|a_4|^2 + |p\omega'_r|^2]$$

Where, $\phi'_{dr}$ is an estimated value of rotor magnetic flux of d-axis, $\phi'_{qr}$ is an estimated value of rotor magnetic flux of q-axis.

The processes described above are repeated for each performance period for estimating the speed of the induction motor and the magnetic flux of the rotor.

As described above, the present invention estimates the speed of an induction motor and the magnetic flux of a rotor using parameters obtained from measurable or calculable variables in execution of an estimation algorithm for estimating the speed of the motor and the magnetic flux of the rotor. The estimation algorithm thus requires fewer calculation equations, compared to the prior estimation algorithm using the full-order observer, thus resulting in a reduced amount of calculation. Accordingly, a sensorless speed control system for induction motors can be easily implemented with the superiority of low-speed characteristics and the stable and fast response characteristics of speed in a wide operation region.

Although the preferred embodiment of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of estimating a speed of an induction motor and a magnetic flux of a rotor, comprising the steps of:
   a) obtaining some measurable or calculable variables for estimating the speed of the induction motor and the magnetic flux of the rotor;
   b) calculating a parameter as a counter-electromotive force of the motor derived from the variables obtained in said step a);
   c) estimating the speed of the motor by use of the parameter calculated in said step b), an estimated value of the parameter, and the obtained variables; and
   d) estimating the magnetic flux of the rotor by use of an estimated value of the speed estimated in said step c) and the parameter.

2. The method according to claim 1, wherein the parameter in said step b) is obtained by the following expressions $$A_d = (i'_{ds} - \omega_e i_{qs} + a_1 i_{ds} - a_0 V_{ds})/a_3$$

$$A_q = (i'_{qs} - \omega_e i_{ds} + a_1 i_{qs} - a_0 V_{qs})/a_3$$

$$a_0 = 1/(\sigma L_s), a_1 = a_0 R_s + M a_2$$

$$a_2 = a_3 a_4,\ a_3 = a_0 M/L_r,\ a_4 = R_r/L_r$$

Where, $A_d$ is a parameter of d-axis, $A_q$ is a parameter of q-axis, $\omega_e$ is a synchronization rotation angular speed, ids is a stator current of d-axis, $i'_{ds}$ is a differential value of stator current of d-axis, $i_{qs}$ is a stator current of q-axis, $i'_{qs}$ is a differential value of stator current of q-axis, $V_{ds}$ is a stator voltage of d-axis, $V_{qs}$ is a stator voltage of q-axis, $L_s$ is a stator inductance, $R_s$ is a stator resistance, M is a mutual inductance, $L_r$ is a rotor inductance, $R_r$ is a rotor resistance, and $a_0 \sim a_4$ are motor model variables.

3. The method according to claim 1, wherein the estimated value of speed estimated in said step c) is obtained by the following expressions $$dA'_d/dt = -a_4 A'_d + (\omega_e - p\ \omega'_r)A'_q + a_5(a_4 i_{ds} + p\omega' i_{qs})$$

$$dA'_q/dt = -a_4 A'_q + (\omega_e - p\,\omega'_r) A'_d + a_5(a_4 i_{qs} - p\omega'_r i_{ds})$$

$$d\omega'_r/dt = -[(A_d - A'_d)(a_5 i_{qs} - A_q) - (A_q - A'_q)(a_5 i_{ds} - A_d)]/p$$

Where, $\omega'_r$ is an estimated value of speed, $A'_d$ is an estimated value of parameter of d-axis, $A'_q$ is an estimated value of parameter of q-axis, p is a number of pole-pairs, $a_5$ is a motor model variable, and $a_5 = M a_4$.

4. The method according to claim 3, wherein the step of estimating the speed of the motor comprises the step of changing the rotation speed $\omega_r$ of the motor so that each of differences $[(A_d - A'_d)$ and $(A_q - A'_q)]$ between a calculated value of parameter and the estimated value of parameter becomes zero for obtaining the estimated value $\omega'_r$ of speed.

5. The method according to claim 1, wherein the estimated value of the magnetic flux of the rotor in said step d) is obtained by the following expressions $$\phi'_{dr} = (a_4 A_d - p\omega'_r A_q)/[|a_4|^2 + |p\omega'_r|^2]$$

$$\phi'_{qr} = (a_4 A_q + p\omega'_r A_d)/[|a_4|^2 + |p\omega'_r|^2]$$

Where, $\phi'_{dr}$ is an estimated value of rotor magnetic flux of d-axis, $\phi'_{qr}$ is an estimated value of rotor magnetic flux of q-axis.

* * * * *

UNITED STATES PATENT AND TRADEMARK OFFICE
CERTIFICATE OF CORRECTION

PATENT NO.    : 6,598,008 B2
DATED         : July 22, 2003
INVENTOR(S)   : Sang-Hoon Lee It is certified that error appears in the above-identified patent and that said Letters Patent is hereby corrected as shown below:

<u>Column 4,</u>
Line 56, change "ids" to -- $i_{ds}$ --.

Signed and Sealed this

Ninth Day of December, 2003

JAMES E. ROGAN
*Director of the United States Patent and Trademark Office*